United States Patent
Tilander

(10) Patent No.: US 7,035,268 B2
(45) Date of Patent: Apr. 25, 2006

(54) SWITCHING METHOD AND APPARATUS

(75) Inventor: Sami Tilander, Vantan (FI)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 10/076,913

(22) Filed: Feb. 13, 2002

(65) Prior Publication Data
US 2002/0154654 A1   Oct. 24, 2002

Related U.S. Application Data

(63) Continuation of application No. PCT/EP99/06503, filed on Sep. 3, 1999.

(51) Int. Cl.
    *H04L 12/28*   (2006.01)

(52) U.S. Cl. ........................................ 370/396; 370/422

(58) Field of Classification Search ...................... None
    See application file for complete search history.

(56) References Cited

U.S. PATENT DOCUMENTS 5,539,884 A    7/1996  Robrock, II
5,754,550 A *  5/1998  Endo .......................... 370/419

(Continued)

FOREIGN PATENT DOCUMENTS

WO    9535611    12/1995
WO    9620448     7/1996

OTHER PUBLICATIONS

"Resource Sharing Technique for ATM Virtual Networking" Global Tel. Conf. US, NY. IEEE 1997, pp. 838-844, by Tan H et al.

(Continued)

*Primary Examiner*—Bob A. Phunkulh
(74) *Attorney, Agent, or Firm*—Alfred A. Fressola; Ware, Fressola, Van Der Sluys & Adolphson, LLP

(57) ABSTRACT

The present invention relates to a switching method and apparatus for performing a switching operation in a telecommunication network, wherein a side information and a service information generated based on a received call is converted into a switching technology independent identification information for identifying a start point and an end point of a connection to be switched in said switching apparatus. Thus, the physical resources of the switch are abstracted to a logical model which provides a clear interface for call control and signaling applications. Logical resources are controlled by resource managers, such that the physical resources are hidden by the switching technology independent identification information of the start point and end point of the connection. Thereby, problems with different switching technologies can be solved, and the complexity and maintenance of call control applications can be reduced, since they handle logical resources independent of the switching techniques.

16 Claims, 6 Drawing Sheets

U.S. PATENT DOCUMENTS 6,359,909 B1 * 3/2002 Ito et al. .................... 370/522
6,434,152 B1 * 8/2002 Yamamura ............... 370/395.2

OTHER PUBLICATIONS

"Service and Traffic Management for IBCN" IBM Systems Journal, US IBM Corp. by Geihs K, vol. 31, No. 4, Jan. 1, 1992, pp. 711-727.

"Performance Evaluation of Integrated IN/B-ISDN Signalling Platforms" by Kolyvas G. et al, Computer Communications, vol. 21, No. 5, Jun. 15, 1998, pp. 606-623.

"Intelligent Network Architecture for Broadband ISDN With Layered Call Model" by Wakamoto, et al. XIV International Symposium, pp. 112-116, Pub. Date Oct. 25, 1992.

* cited by examiner

SWITCHING METHOD AND APPARATUS

CROSS-REFERENCE TO RELATED APPLICATION

This application is a continuation of International Application PCT/EP99/06503 having an international filing date of Sep. 3, 1999 and from which priority is claimed under all applicable sections of Title 35 of the United States Code including, but not limited to, Sections 120, 363 and 365(c).

FIELD OF THE INVENTION

The present invention relates to a method and network element for performing switching between an incoming side and outgoing side of the network element in a telecommunication network such as a third generation mobile network.

BACKGROUND OF THE INVENTION

In the near future, multimedia applications will in full scale enter the world of cellular communications. To support new services, which will set new demands on the infrastructure for radio communications, a new wireless communication system needs to be developed. Third-generation mobile telecommunication systems are now being determined by the global standardization work conducted by public authorities and the industry.

The role of third generation cellular systems will be to satisfy the needs for immediate access to people and information both in the office environment and globally. Requirements on the third generation cellular systems will range from basic speech services to high speed data services, both circuit switched and packet switched. Services will be symmetric as well as asymmetric and will support applications like Internet browsing and video conferencing. It is expected, that voice still will be a dominating application, so flexibility in bandwidth provision to individual users and high efficiency in bandwidth utilization is essential.

In particular, IMT 2000 (International Mobile Telephony 2000) and UMTS (Universal Mobile Telecommunication System) will open up a new spectrum with a new access method that will further serve to increase the capability of cellular systems. UMTS/IMT-2000 access will coexist with the already existing and evolved GSM access and will support full roaming and handover from one system to another, with service mapping between the two access systems.

Furthermore, packet traffic will increase significantly in the future and a packet switched base network will be required. ATM (Asynchronous Transfer Mode) technology is the coming standard as data traffic bearer and a new ATM Adaptation Layer, AAL2, has been standardized to support delay sensitive speech packets. Therefore, ATM switches have been designed for cost efficient switching as well as for transport in cellular systems. Mobile Switching Centers (MSC) handle preliminary Iu interfaces towards Radio Network Controllers (RNC) using AAL2 and AAL5 protocols, and fixed network interfaces towards ISDN (Integrated Services Digital Network) ATM LANs (Local Area Networks) and modems.

The RNCs house a radio network control function such as connection establishment and release, handover power control and radio resource handling functions. Moreover, diversity combining services, used at soft handover, and transcoding functions are also located in the RNCs. Each RNC is built on a generic ATM switch, wherein all devices and a processor of the RNC are connected to the ATM switch. Several BTSs (Base Transceiver Stations) can be connected to the RNC via ATM links.

Furthermore, IWU (Interworking Units) are provided in the mobile network in order to support connection to conventional GSM networks and other fixed circuit switched or packet switched networks.

Thus, in switching network elements, a problem arises that complexity and maintenance of call control applications increases due to the combined use of different versions of the applications in different switching techniques or different network generations.

The WO 9620448 discloses a flexible network platform and call processing system based on a logical model which provides an easy way to handle difficult (e.g. multiparty) situations. The flexible network platform is loosely coupled to a telecommunication network and provides services for subscribers, which services may be addressed by dialed numbers. The services relate to basic functionalities such as tones and the like. The logical resource model in the flexible network platform is composed of sessions, legs, virtual terminals, channels and logical resources, wherein a logical resource is an abstraction of the corresponding physical resource in the network.

Furthermore, the EP 0 765 582 discloses a resource model consisting of three layers, i.e. a network layer, a node layer and a component layer. In particular, the resource model deals with network level resources and not with resources inside a switching network element. Moreover, the resource model is an upper level resource model and does not take into account any service like tones or the like.

SUMMARY OF THE INVENTION

It is therefore an object of the present invention to provide a method and apparatus for performing a switching operation in a telecommunication network, by means of which the problems associated with different switching technologies can be solved.

This object is achieved by a method for performing a switching operation in a network element of a telecommunication network, said method comprising the steps of:

generating a side information and a service information based on a received call, said side information indicating an incoming and/or outgoing side of said switching operation in said network element, and said service information indicating a switching service requested by said received call;

converting said side information and said service information into a switching technology independent identification information for identifying a start point and an end point of the connection to be switched at said incoming and/or outgoing side; and controlling said switching operation based on said identification information.

Furthermore, the above object is achieved by a switching apparatus for performing a switching operation in a telecommunication network, said apparatus comprising:

call resource managing means for generating a side information and a service information based on a received call, said side information indicating an incoming and/or outgoing side of said switching operation within said switching apparatus, and said service information indicating a switching service requested by said received call;

logical resource managing means for converting said side information and said service information into a switching technology independent identification information for identifying a start point and an end point of a connection to be switched at said incoming and/or outgoing side; and switching control means for controlling the switching operation based on the identification information.

Accordingly, physical resources of the switch are abstracted to a logical model which provides a clear interface for call control and signaling applications. The logical model consists of sides and logical services. The logical resources are controlled by the logical resource managing means, such that details of the resources are hidden behind the abstract logical resource. Thereby, the problems associated with different switching technologies can be solved, since switching technology independent resources are provided for call control applications, and the same control software can be used for different physical resources. The call control applications complexity and maintenance are therefore reduced, since they can handle logical resources and there is no need for different versions of the applications in different switching techniques.

Preferably, the incoming and outgoing sides are reserved separately, and connected to each other when a corresponding through connection is requested.

The switching service may comprise a tone generation, a push button receiving function, an announcement, a multi party conference call, and other services. Thus, the above switching service functions can be accessed by a switching technology independent logical resource interface, wherein the internal switching in the switching apparatus is controlled based on the respective logical resources.

Furthermore, the converting step may be performed in a distributed manner in a connection control procedure, a virtual path connection procedure and a virtual channel connection procedure. Thus, the logical resource interface can be implemented as a distributed interface in several program blocks of a control program. However, the operator is not affected.

Alternatively, the converting step may be implemented as a process family having a hand process for each call, wherein one hand process takes care of resources of a corresponding call. Due to the hand processes, the internal structure of the program block can be simplified. The resources of a call are collected at one place and the performance is increased by using the hand processes. Furthermore, an easy maintenance can be achieved due to the simplified implementation. The logical resource interface can thus be distributes over several computers, preferably the same computers as used for the signaling and call control processes of the switching apparatus. The interface may be implemented on any other hardware platform, such as ATM (Asynchronous Transfer Mode), TDM (Time Divisional Multiplex) hardware, or IP (Internet Protocol) based frame relay hardware.

The incoming side is connected to the outgoing side with a through connection, when a speech or data signal can be transmitted. In particular, the incoming side is connected to the outgoing side via the end point of the incoming side. Furthermore, a state information may be allocated to the incoming side and/or to the outgoing side, said state information indicating whether a resource of the respective side can be connected to the other side.

The identification information may include details of physical connections related to services which are to be switched. Thereby, the internal switching of the connections to the physical resources can be optimized with respect to the services.

In case the service information indicates a service combining respective branches, such as a macro diversity combining function, several start points can be combined with a single end point. Thereby, a plurality of branches are connected to the same subscriber.

The call resource managing means may be arranged to perform call identification, resource request and/or release, connection and/or disconnection of calls for applications. Moreover, the call resource managing means may be arranged to keep track of connections at the incoming and/or outgoing side. To achieve this, an identification number may be allocated to each connection by the resource managing means.

Furthermore, the switching apparatus may comprise logical service managing means arranged for determining switching connections based on the identification information and for supplying a corresponding switching information to the switching control means. Thus, the logical service managing means abstracts the details of the switching technology such that complex connections are not visible to the upper levels, i.e. the logical resource management means and the call resource management means.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
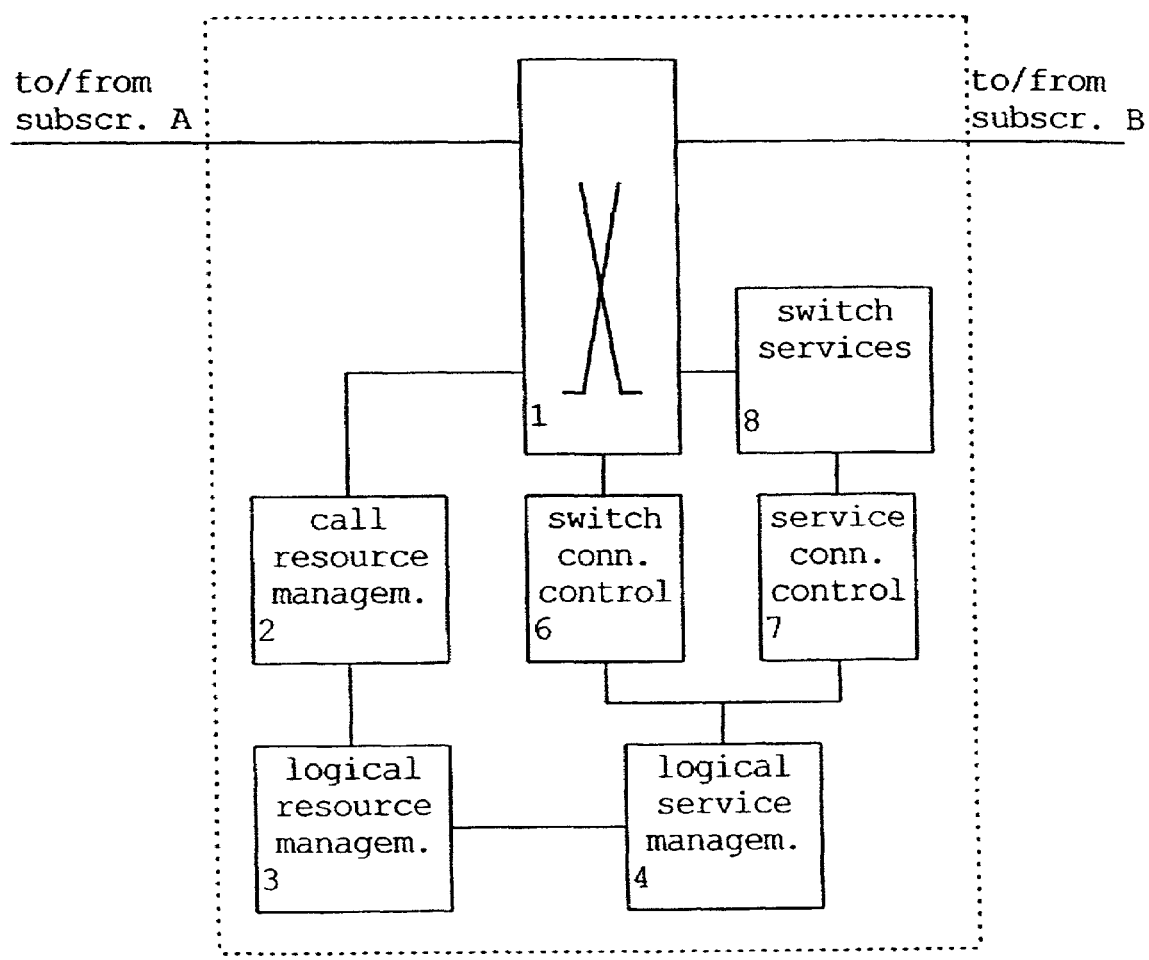
FIG. 1 shows a principle block diagram of a switching apparatus according to the preferred embodiment.

In the following, the preferred embodiment of the switching method and apparatus according to the present invention will be described on the basis of a switching network element as shown in FIG. 1.

According to FIG. 1, the switching network element according to the preferred embodiment comprises a switching unit 1 such as an ATM switch or a TDMA switch, which is arranged for switching connections between a subscriber A and a subscriber B. Moreover, the switching unit 1 may switch the connection of the subscriber A or the connection of the subscriber B to a switch service unit 8 to thereby provide the respective connection with switching service functions such as tone or announcement generators, push button receivers, multi party conference call functions and the like. The switch service unit 8 is controlled by a service connection control unit 7 which is arranged to control the switch service unit 8 so as to provide a requested service function at a service point to which the respective connection is connected by the switching unit 1.

The switching function of the switching unit 1 is controlled by a switch connection control unit 6 arranged to perform a switching connection control so as to achieve a desired switching function requested by a received call or call request.

According to the preferred embodiment, the call resource handling of the switching network element is based on a logical model which provides switching technology independent resources for call control applications. Thereby, a general control software can be used for different physical resources.

In particular, the logical model is implemented by providing a call resource management unit 2 which provides functions like call identification, resource request/release, connecting/disconnecting of calls for respective applications. Based on a received call, the call resource management unit 2 supplies a side-specific information and a service-specific information to a logical resource management unit 3 provided in the switching network element. Furthermore, the call resource management 2 keeps track of the connection at the incoming and outgoing side of the switching unit 1. To achieve this, the call resource management unit 2 allocates an unambiguous identification number to each connection, which can be used for statistics and charging purposes.

The logical resource management unit 3 provides a logical interface or resource for the call resource management unit 2, such that the details of the switching technique are hidden. Based on the side and service information and resource classification parameters received from the call resource management unit 2, the logical resource management unit 3 allocates logical services to the incoming side and the outgoing side of the switching unit 1. The resource classification parameters are technology independent and describe the nature, e.g. bandwidth, delays etc., of the resource. Each side object is identified by a logical identifier which refers to a start point of the side object, i.e. logical service. The identifier is switching technology independent. Additionally, an end point is allocated to the side object, which may be the same as the start point. A connection to the other side of the switching unit 1 is performed through the end point.

Furthermore, the logical resource management unit 3 allocates a state to each side object, which indicates whether the corresponding physical resource can be connected to another side, or not Thus, each side object encapsulates the details of the physical connections related to the services, such that the connections are protected in complex e.g. multi party situations. Moreover, a side object can be branched, i.e. it may have several start points but only one end point. The branchable side object must be related to a logical service which combines the respective branches.

The logical resource management unit 3 generates switching technology independent resource classification parameters and supplies these parameters to a logical service management unit 4 arranged for controlling the switch connection control unit 6 and the service connection control unit 7 based on the received parameters, wherein the logical resources defined by the logical resource management unit 3 can be implemented by different switching hardware functions.

Accordingly, the logical resource interface established by the logical resource management unit 3 provides a clear, logical interface for the call resource management unit 2 to handle physical resources associated to a call, i.e. seize and release resources.

It is to be noted that the above described functional blocks of the switching apparatus may be implemented by discrete hardware circuits or by software programs stored in the switching apparatus and used to control a respective processor unit or a plurality of computer units.

As a first example, the logical resource management unit 3 may be implemented as a distributed interface in several program blocks. In this case, the interface can be integrated in a connection control procedure or function, a virtual path connection procedure or function and a virtual channel connection procedure or function. The interface may be even more distributed, e.g. in TDM resources. Thus, the operator is not affected by the implementation of the logical resource interface.

Alternatively, as a second example, the call resource management unit 2 may be implemented as a process family having a hand process for each call. In particular, one hand process takes care of the resources of a call. The hand processes simplify the implementation, because a hand process only needs to know the resources of one call. In particular, a client function controls a master function to create a hand process which may then communicate directly with the client function. The hand process then controls the connection control procedure, virtual path connection selection and virtual channel connection selection for the respective call.

The logical resource interface may be used on ATM or TDM hardware or on any hardware of any other switching technique. Moreover, it may be distributed over several computers in which the signaling and call control processes are performed.

As a third example, the logical resource management unit 3 of the above second example may be modified such that the interface to the connection control procedure or function is implemented as function calls. Thus, the connection control procedure is implemented as a module linked to the respective hand process of a call. Thus, the respective hand procedure of a call and the connection control procedure or function share a common interface to the virtual path connection selection and virtual channel connection selection procedures. Thereby, the number of message transmissions between the procedures can be reduced.

If the message transmission constitutes a bottleneck in the switching network element, e.g. the ATM exchange, the above third implementation example is most suitable for the logical resource interface. However, internal changes in the connection control procedure may complicate the maintenance, such that it may be more reasonable to select the first or second example as the implementation method.

Furthermore, a hand refreshing service may be provided by the call resource management unit 2. The hand refreshing service may comprise refreshing and/or supervising services for the hand processes needed in one call. The call control and signaling hand processes, if implemented as process families, may also be joined to the refreshing service. A hand group is generated by a hand process (of the call resource management unit 2) controlling the call.

The refreshing service assures that all hand processes in a hand group are functioning properly. If the refreshing service detects any faults, it will release the whole call.

Furthermore, the logical resource management unit 3 may provide a resource hunting function, wherein the call resource management unit 2 is arranged to request a side using a technology-independent resource identifier, or using a route, i.e. a group of resources leading to the same direction with equal characteristics. If the resource is requested by a route, the logical resource management unit 3 derives the actual resources by using a selection method. Then, the logical resource management unit 3 returns a technology-independent identifier for the allocated resource.

In the following, the logical model underlying the present invention is described in greater detail on the basis of FIG. 2. According to FIG. 2, the logical model consists of three different levels, i.e. a call, side, and logical service level. Each level is handled by its own resource management unit, i.e. the call resource management unit 2, the logical resource management unit 3, and the logical service management unit 4.

The call level is handled by the call resource management unit 2. Each call has two logical resources, an incoming side and an outgoing side. The sides are connected with a through connection, if a speech or data signal is transmitted. The sides of the call are logical resources used to abstract any physical resource to related to the call. Each side object encapsulates the internal details of the resource. The call resource management unit 2 supplies the corresponding logical side information specifying the incoming side and the outgoing side, and a corresponding service information specifying the internal details of the resource (service) to the next lower side level handled by the logical resource management unit 3.

According to the side level, one side has a start point and an end point, which are visible at the call level and which are identified by technology independent identifiers. Each side object may obtain a logical service. Thus, the side level provides a logical resource for the call resource management unit 2 and hides the details of the switching technique. Each side object encapsulates the details of the physical connections related to the services.

Finally, a logical service level is defined, which is handled by the logical service management unit 4. One logical service abstracts the details of the switching technology. The actual complex physical connections switched by the switching unit 1 are not visible to the upper levels. As already mentioned, each logical service represents a switching service like a tone, an announcement, a multi party conference call or the like. According to the case shown in FIG. 2, a tone generator (TG) is selected as a side object (logical resource), wherein a dialing tone service point and a silent tone service point are to be connected by the switching unit 1 according to the incoming side and outgoing side, defined by the upper levels.

Figure 2:
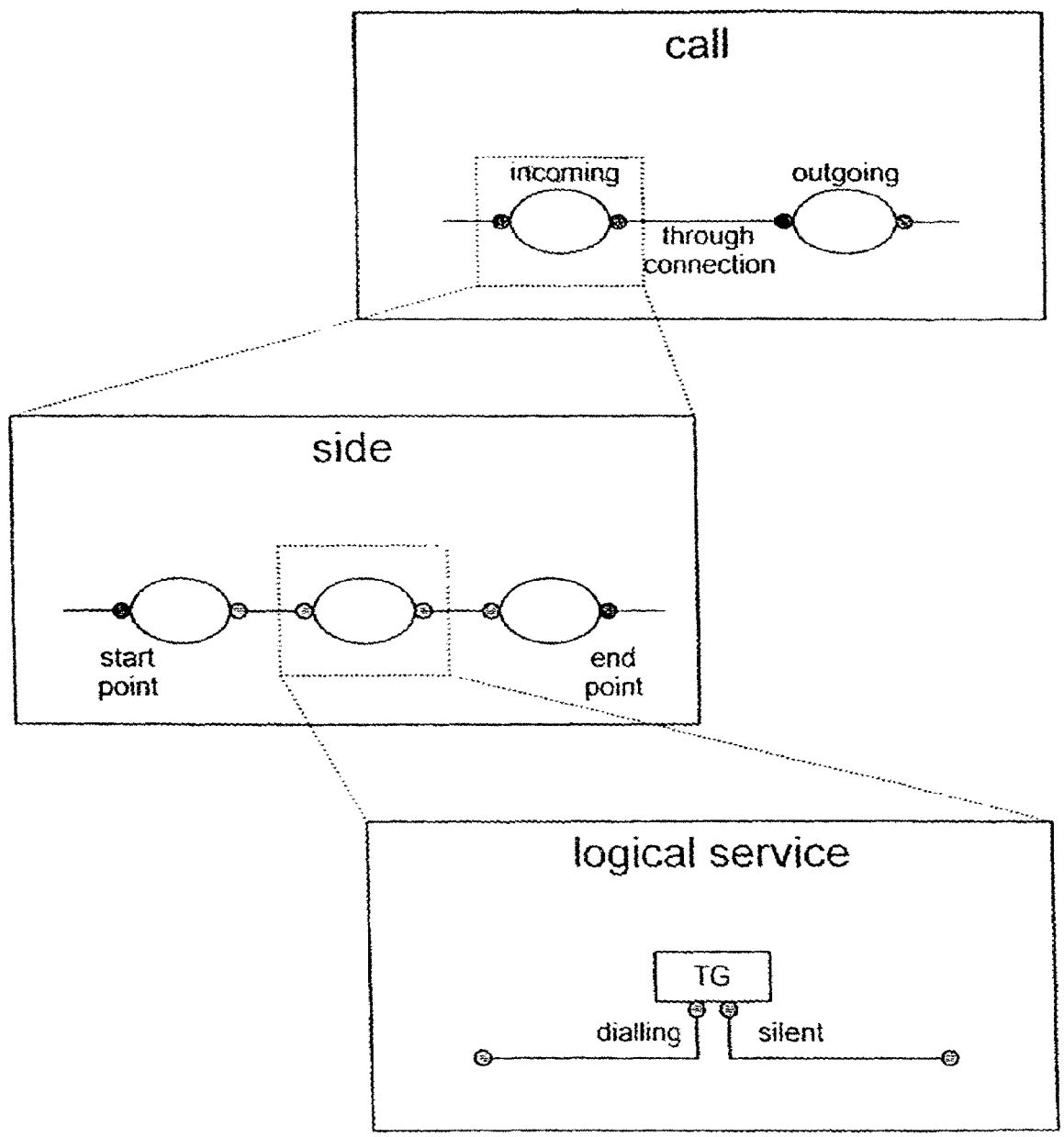
FIG. 2 shows a logical model underlying the present invention.
Figure 3:
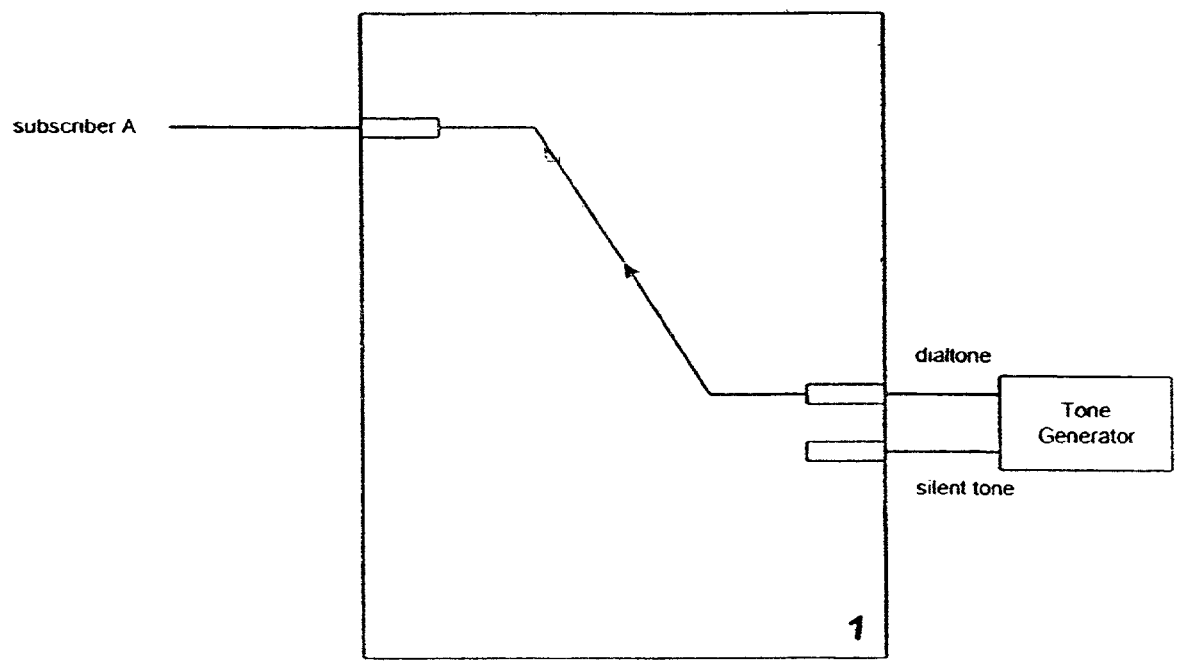
FIG. 3 shows physical connections of a first operation example of the preferred embodiment.

FIG. 3 shows the incoming physical connections underlying a first example corresponding to the logical model shown in FIG. 2. In particular, the call resource management unit has requested an incoming side from the logical resource management unit 3, wherein a dial tone-service is to be supplied to the requested incoming side. Thus, the logical service management unit 4 controls the switch connection control unit 6 so as to switch a connection between the subscriber A at the incoming side and a specific service point at the switch service unit 8, which provides a dial tone. The logical service management unit 4 obtains the required service point identification based on a response of the service connection control unit 7 to a respective request issued by the logical service management unit 4.

In the following, a second operation example is described on the basis of FIG. 4 and 5.

Figure 4:
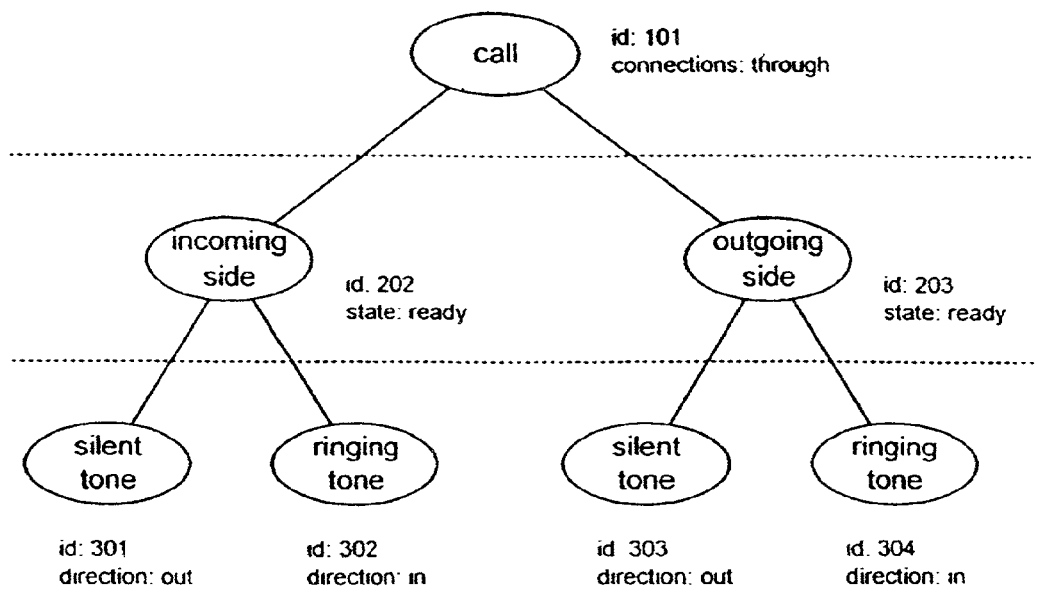
FIG. 4 shows a logical model of a second operation example of the preferred embodiment.

FIG. 4 shows the logical model relating to a case where the call resource management unit 2 has requested an incoming side and an outgoing side from the logical resource management unit 3. As the service information, the call resource management unit 2 has specified a through connection between the incoming side and the outgoing side. The call has been identified by the identification "101".

Then, the logical resource management unit 3 defines an incoming side having an identification "202" and a state "ready", and an outgoing side having an identification "203" and a state "ready", and requests a corresponding logical service from the logical service management unit 4. The logical service management unit 4 allocates a logical silent tone service (identification "301" and direction "out") and a logical ringing tone service (identification "302", direction "in") to the incoming side. Moreover, the logical service management unit 4 allocates a logical silent tone service (identification "303", direction "out") and a logical ringing tone service (identification "304", direction "in") to the outgoing side.

Figure 5:
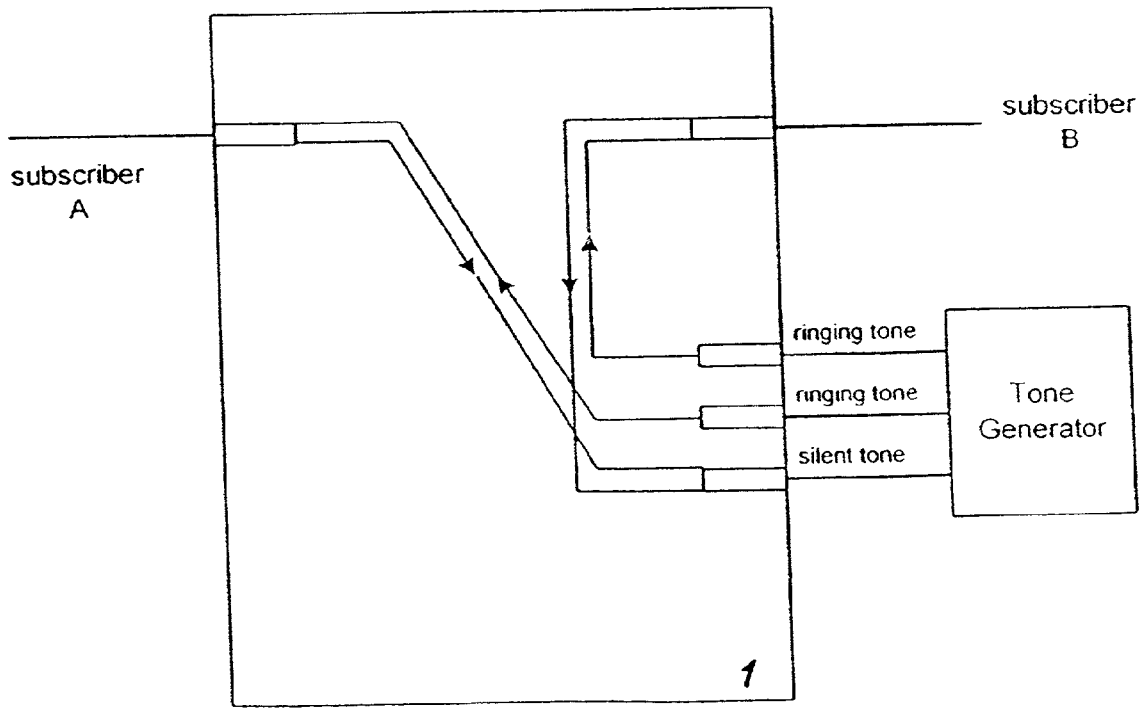
FIG. 5 shows physical connections of the second operation example.

FIG. 5 shows the corresponding physical connections provided by the switching unit 1 based on the control of the logical service management unit 4. In particular, respective service points of the switch service unit 8 (corresponding to the tone generator) are supplied by the service connection control unit 7 to the logical service management unit 4 which controls the switching control unit 6 so as to switch the corresponding connections.

In the following a third operation example is described with reference to FIG. 6 and 7.

Figure 6:
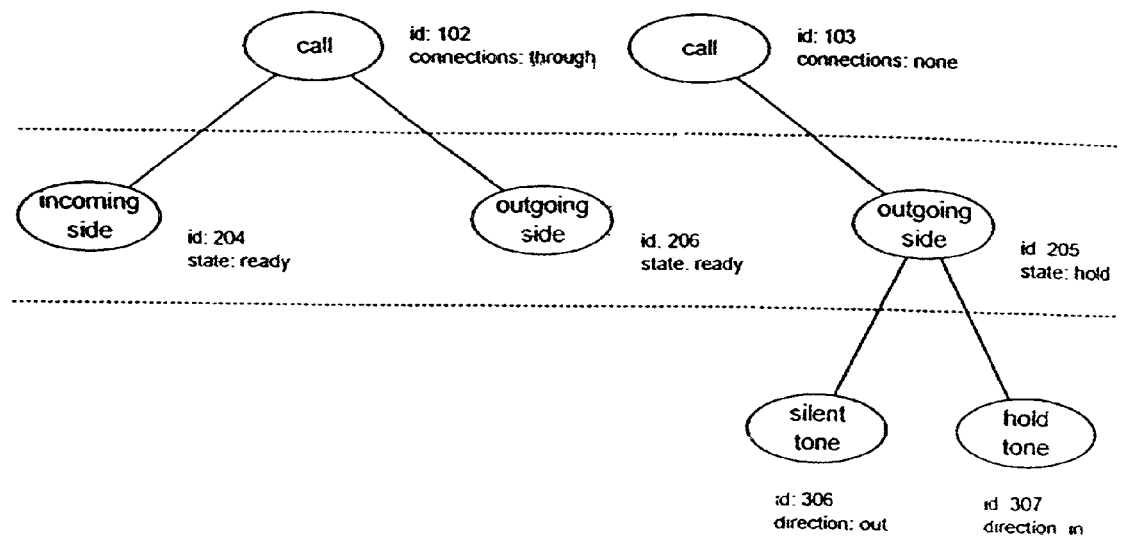
FIG. 6 shows a logical model of a third operation example of the preferred embodiment.
Figure 7:
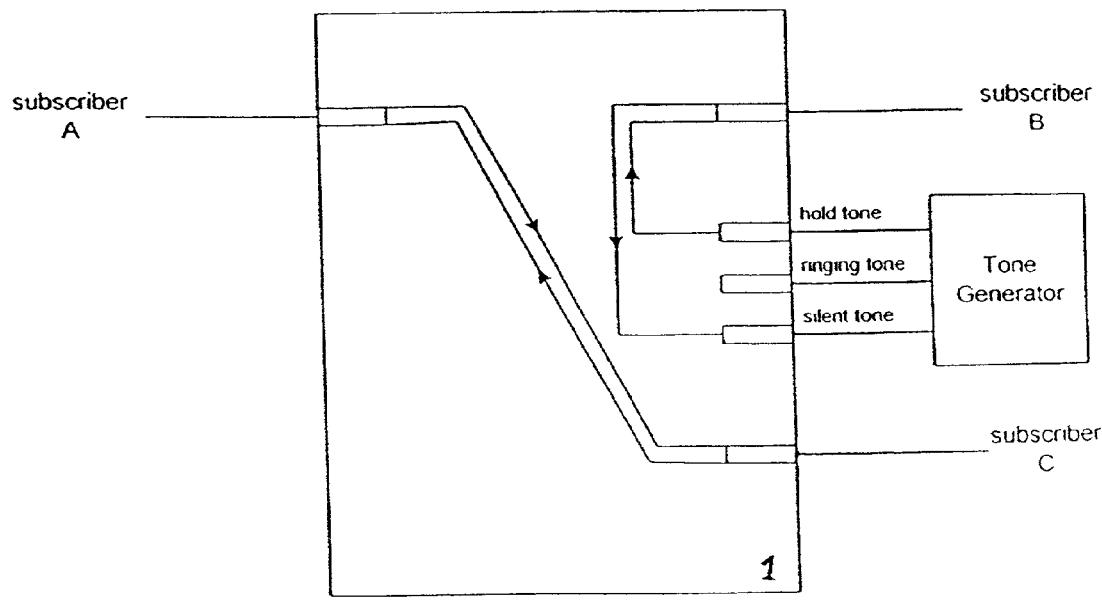
FIG. 7 shows physical connections of the third operation example.

According to the logical model shown in FIG. 6, the third operation example relates to a case where a subscriber A makes an inquiry call ("102") to a subscriber C, while a call ("103") is already established between subscribers A and B. The call resource management unit 2 has requested both incoming and outgoing sides and a through connection between them. When the subscriber A conducts the inquiry call, a new call ("102") is created and the resources of the subscriber A are moved to that call. Thus, as shown in FIG. 6, an incoming side and an outgoing side (identification "204" and "206") are requested with a through connection. When the new call is then received, an outgoing side is requested by the call resource management unit 2 without any connection. Thus, the logical resource management unit 3 allocates a state "hold" and an identification "205" to the outgoing side, such that the logical service management unit 4 defines a logical silent tone service (identification "306") to the outgoing direction of the outgoing side, and a logical hold tone service (identification "307") to the incoming direction of the outgoing side. The respective physical connections in the switching unit 1 are shown in FIG. 7. Thus, a throughput connection is established between the subscribers A and C, and the new call requested by a subscriber B is set into a hold status.

Figure 8:
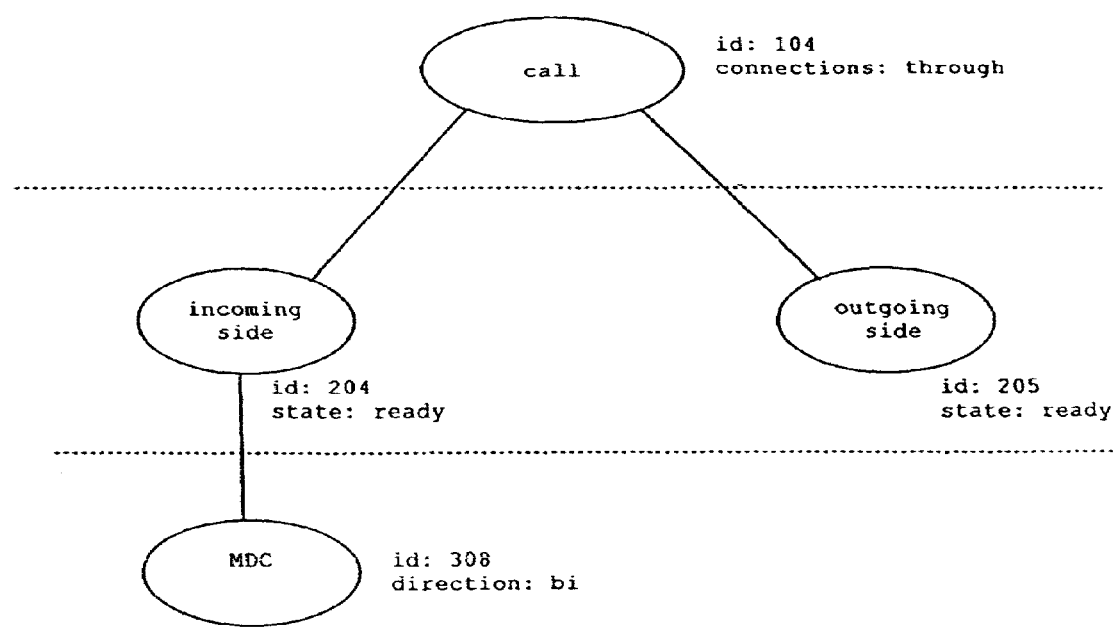
FIG. 8 shows a logical model of a fourth operation example of the preferred embodiment.

Finally, a fourth operation example is described on the basis of FIG. 8, wherein a switching network element, such as a Radio Network Controller (RNC) of a third generation (3G) mobile network is used.

According to FIG. 8, the call resource management unit 2 has requested both an incoming and an outgoing side and a through connection between them. Based on this information, the logical resource management unit 3 allocates start points and end points to the incoming and outgoing sides. It also requests an MDC (Macro Diversity Combining) service for the incoming side from the logical service management unit 4.

Figure 9:
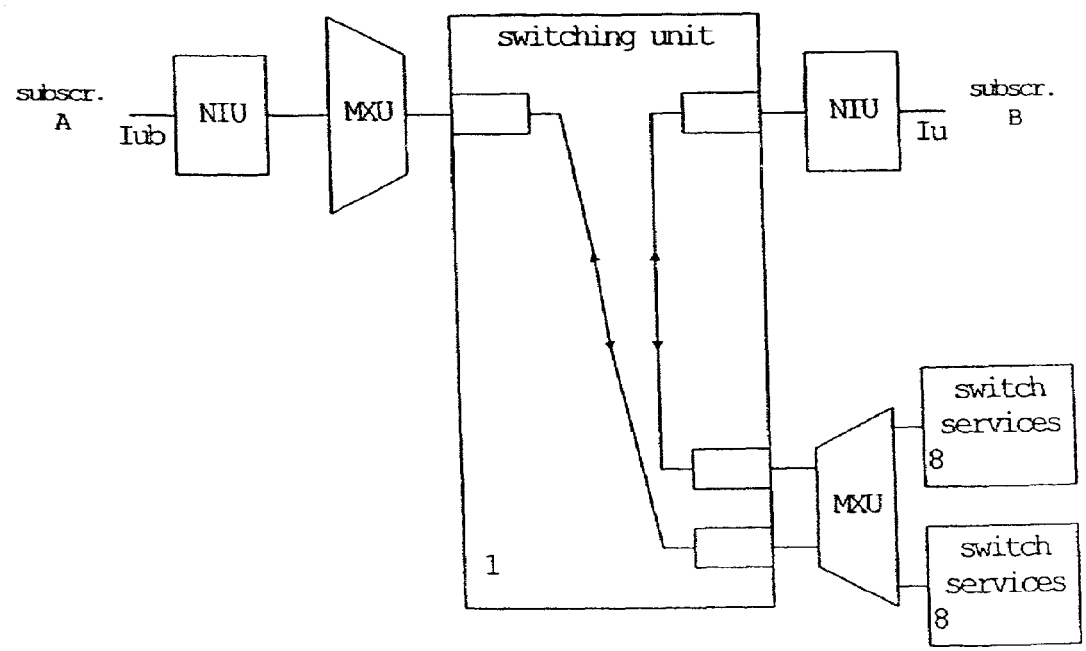
FIG. 9 shows physical resources and connections of the fourth operation example.

As shown in FIG. 9, the RNC connects an incoming $I_{ub}$ interface (base station side) via a network interface unit (NIU), a multiplexer unit (MXU) and a switching unit 1 to the respective connection service (MDC) required for establishing the through connection between the $I_{ub}$ interface and the $I_u$ interface. The required services are switched by the respective multiplexing units (MXU) and connected to a network interface unit at the outgoing side (Iu interface of the mobile network).

In the Radio Network Controller shown in FIG. 9, the units 2, 3, 4, 6, 7 and 8 shown in FIG. 1 are not explicitly shown and may be implemented as software features of a control program controlling the multiplexing and switching functions of the Radio Network Controller.

It is to be pointed out that the switching method and apparatus described in the preferred embodiment can be applied to any switching network element of any telecommunication network. The switching apparatus may be implemented as a single apparatus or as a distributed element comprising several distributed apparatuses or control programs running on distributed computers systems. The preferred embodiment of the invention may thus vary within the scope of the attached claims.

In summary, the present invention relates to a switching method and apparatus for performing a switching operation in a telecommunication network, wherein a side information and a service information generated based on a received call is converted into a switching technology independent identification information for identifying a start point and an end point of a connection to be switched in said switching apparatus. Thus, the physical resources of the switch are abstracted to a logical model which provides a clear interface for call control and signaling applications. Logical resources are controlled by resource managers, such that the physical resources are hidden by the switching technology independent identification information of the start point and end point of the connection. Thereby, problems associated with different switching technologies can be solved, and the complexity and maintenance of call control applications can be reduced, since logical resources are handled independent of the switching techniques.

The invention claimed is:

1. A method for performing a switching operation in a network element of a telecommunication network, said method comprising the steps of:
    a) generating a side information and a service information based on a received call, said side information indicating an incoming and/or outgoing side of said switching operation in said network element, and said service information indicating a switching service requested by said received call;
    b) converting said side information and said service information into a switching technology independent identification information for identifying a start point and an end point of a connection to be switched at said incoming and/or outgoing side; and
    c) controlling said switching operation based on said identification operation.

2. A method according to claim 1, wherein said incoming and/or outgoing sides are reserved separately, and connected to each other when a corresponding through connection is requested.

3. A method according to claim 1, wherein said switching service comprises at least one of a tone generation, a push button receiving function, an announcement, and a multi party conference call.

4. A method according to claim 1, wherein said converting step is performed in a distributed manner in a connection control procedure, a virtual path connection procedure, and a virtual channel connection procedure.

5. A method according to claim 1, wherein said converting step is implemented as a process family having a hand process for each call, wherein one hand process takes care of resources of a corresponding call.

6. A method according to claim 5, wherein a hand refreshing service is provided for refreshing and supervising hand processes needed in one call.

7. A method according to claim 1, wherein said incoming side is connected to said outgoing side with a through connection, when a speech or data signal can be transmitted.

8. A method according to claim 1, wherein said incoming side is connected to said outgoing side via the end point of said incoming side.

9. A method according to claim 1, wherein a state information is allocated to said incoming side and/or said outgoing side, said state information indicating whether a resource of a respective side can be connected to the other side.

10. A method according to claim 1, wherein said identification information includes details of physical connections related to services which are to be switched.

11. A method according to claim 1, wherein several start points are combined with a single end point, if the service information indicates a service combining respective branches.

12. A switching apparatus for performing a switching operation in a telecommunication network, said apparatus comprising:
    a) call resource managing means (2) for generating a side information and a service information based on a received call, said side information indicating an incoming and/or outgoing side of said switching operation within said switching apparatus, and said service information indicating a switching a service requested by said received call;
    b) logical resource managing means (3) for converting said side information and said service information into a switching technology independent identification information for identifying a start point and an end point of a connection to be switched at said incoming and/or outgoing side; and
    c) switching control means (6) for controlling said switching operation based on said identification information.

13. An apparatus according to claim 12, wherein said call resource management means (2) is arranged to perform a call identification, a resource request and/or release, a connection and/or disconnection of calls for applications.

14. An apparatus according to claim 12, wherein said call resource managing means (2) is arranged to keep track of connections at said incoming and/or outgoing side.

15. An apparatus according to claim 14, wherein an identification number is allocated to each connection by said call resource managing means (2).

16. An apparatus according to claim 12, further comprising logical service managing means (4) arranged for determining switching connections based on said identification information and for supplying a corresponding switching information to said switching control means (6).

* * * * *